US006611126B2

(12) United States Patent
Mizuno

(10) Patent No.: US 6,611,126 B2
(45) Date of Patent: Aug. 26, 2003

(54) INJECTION MOLDING MACHINE CAPABLE OF REDUCING POWER CONSUMPTION

(75) Inventor: Hiroyuki Mizuno, Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 263 days.

(21) Appl. No.: 09/750,721

(22) Filed: Jan. 2, 2001

(65) Prior Publication Data

US 2001/0015506 A1 Aug. 23, 2001

(30) Foreign Application Priority Data

Feb. 22, 2000 (JP) .................................. 2000-043942

(51) Int. Cl.[7] ............................................... H02P 5/34
(52) U.S. Cl. ...................... 318/801; 318/805; 318/810; 318/812; 264/328.1; 264/40.1; 425/150; 320/127; 320/128; 320/135; 320/152
(58) Field of Search ................. 318/798–802, 318/805, 810–812, 739, 743; 264/40.1, 328.1; 425/135, 139, 150; 320/111, 127, 128, 135, 152

(56) References Cited

U.S. PATENT DOCUMENTS 4,935,684 A * 6/1990 Watanabe .................. 318/729
5,200,644 A * 4/1993 Kobayashi et al. ............ 307/66
5,362,222 A * 11/1994 Faig et al. .................. 425/145
6,002,220 A * 12/1999 Takahashi et al. .......... 318/139
6,062,843 A * 5/2000 Yamaura .................... 425/136
6,333,611 B1 * 12/2001 Shibuya et al. ............. 318/370

FOREIGN PATENT DOCUMENTS

| EP | 61132319 | 6/1986 |
| EP | 03040787 | 2/1991 |
| EP | 04075485 | 3/1992 |
| EP | 2000141440 | 5/2000 |

* cited by examiner

*Primary Examiner*—Bentsu Ro
*Assistant Examiner*—Rina I. Duda
(74) *Attorney, Agent, or Firm*—Squire, Sanders & Dempsey LLP

(57) ABSTRACT

A motor drive 50 of an induction motor IM includes an inverter section 20, a charger 60, a charging and discharging circuit 70 and a control section 80. The charger 60 is for storing regenerated electric power of the induction motor via the inverter section. The charging and discharging circuit 70 is for making the charger charge electric power and making the charger discharge the electric power. The control section carries out control of the charging and discharging circuit for making the charger charge the electric power when the induction motor generates regenerated electric power and making the charger supply the electric power to the induction motor in accelerating the induction motor or in electricity interruption.

19 Claims, 3 Drawing Sheets

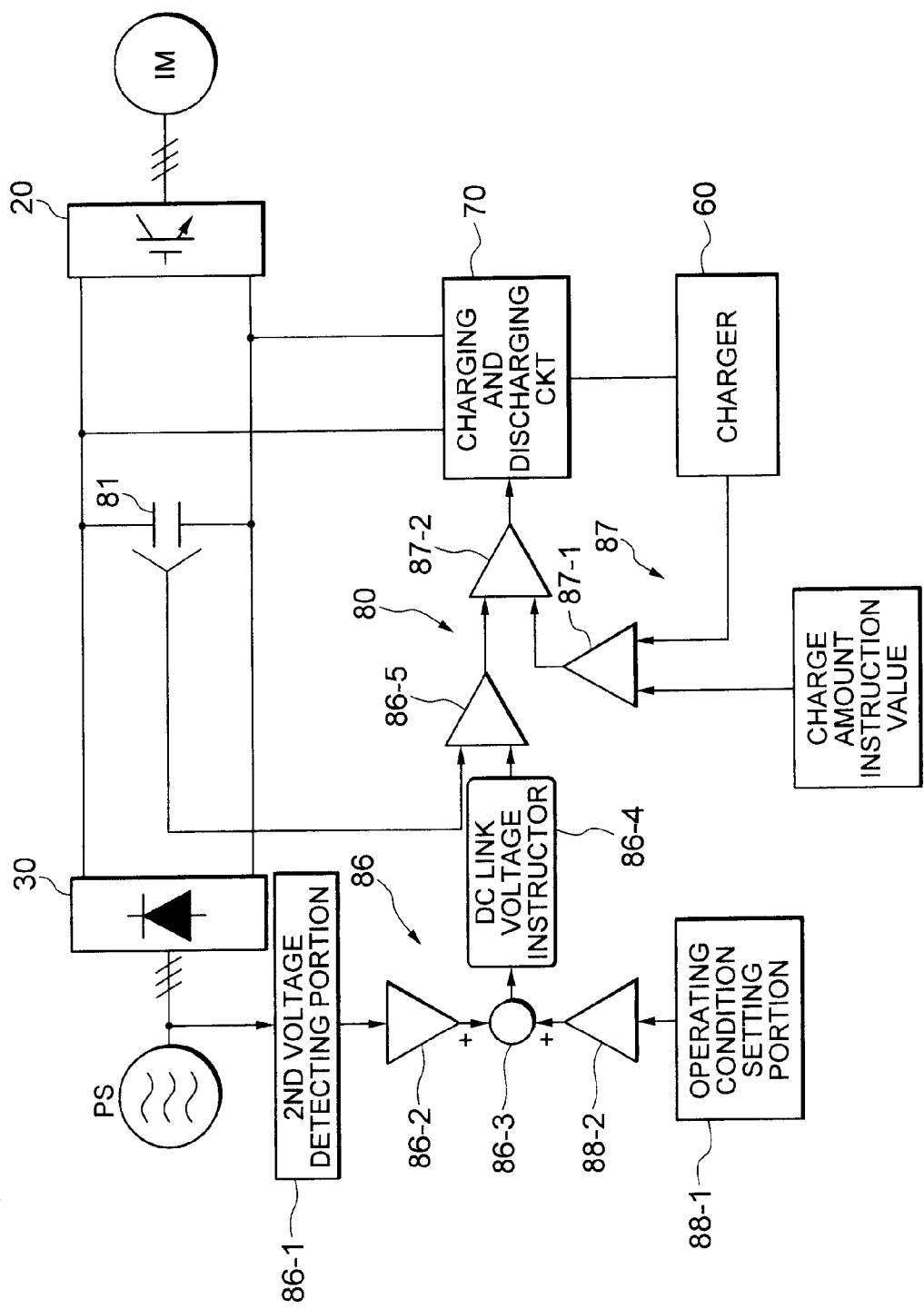

INJECTION MOLDING MACHINE CAPABLE OF REDUCING POWER CONSUMPTION

BACKGROUND OF THE INVENTION

The present invention relates to an injection molding machine having an injection device and a mold opening and closing device, particularly to a motor-driven injection molding machine using motors as drive sources in the injection device and the mold opening and closing device.

As is well known, according to a motor-driven injection molding machine, respective functions of injection, mold opening and closing, measurement and ejector, are realized by individually installed motors. Induction motors are normally used for such motors. An explanation will be given of an example of a motor drive for such a motor in reference to FIG. 1. In FIG. 1, a motor drive 10 is for a three phase induction motor IM and includes an inverter section 20 and a rectifying circuit section 30. The inverter section 20 includes a plurality of switching elements 21 for carrying out switching operation for respective phases of three phases. The rectifying circuit section 30 is realized by a condenser input type diode rectifying circuit. The diode rectifying circuit includes a plurality of diodes 31 for carrying out rectifying operation for respective phases of a three phase power source PS.

Meanwhile, the induction motor IM for the injection device or the mold opening and closing device generates regenerated electric power in deceleration thereof. Heretofore, in the motor drive, regenerated electric power of the induction motor IM is dissipated as heat by a resistor 41 provided to a dynamic brake circuit section 40. That is, when the induction motor IM generates regenerated electric power, the switching element 42 is switched on and the regenerated electric power is dissipated by the resistor 41. From a view point of reduction of electric energy, wasteful electric energy is dissipated. In addition thereto, there is constituted a heat radiating device for radiating generated heat of the resistor 41 and therefore, there poses a problem of an increase in dimensions.

As a measure with regard to the above-described regenerated electric power, there is provided even a system enabling power source regeneration by replacing the rectifying circuit section 30 by a power source regenerating converter. However, the power source regenerating converter is expensive.

Further, other than the above-described, it is the current situation that heretofore, according to the injection molding machine, no measure has been taken for electricity interruption except a necessary minimum power source backup function. Therefore, when molding operation is stopped by electricity interruption in the midst of a molding cycle during the operation, in the case in which resin is not sufficiently charged in a mold, an ejector mechanism cannot eject unmolded product in the mold. In this case, the unmolded product, that is, a failed molded product must be taken out by manual operation. Time and labor is required in taking it out and depending on cases, the mold must be disassembled. Further, when the operation is stopped in the midst of the molding cycle by electricity interruption, much time and labor is required and skill is needed in resetting peripheral apparatus of the injection molding machine in restarting thereof.

SUMMARY OF THE INVENTION

Hence, it is an object of the present invention to provide an injection molding machine capable of reducing power consumption by achieving effective utilization of regenerated electric power of a motor.

It is another object of the present invention to provide an injection molding machine capable of utilizing regenerated electric power of a motor to operation in electricity interruption.

An injection molding machine according to the present invention comprises a drive source comprising at least one motor and a motor drive, a charger for storing regenerated electric power of the motor and electric power from a power source, a charging and discharging circuit connected to the charger for charging electric power to the charger and for discharging electric power therefrom, and a controller for controlling the charger to charge electric power and for controlling the charger to supply electric power to the motor. The controller controls the charger by controlling the charging and discharging circuit based upon an operating condition of the injection molding machine.

According to another aspect of the present invention, a method of providing drive power to an injection molding machine is provided. The method comprises the steps of controlling a charger to charge electric power from a power source and to supply electric power to a motor of the injection molding machine. A controller provides control signals to a charging and discharging circuit based upon an operating condition of the injection molding machine.

BRIEF DESCRIPTION OF THE DRAWINGS

FIG. 3 is a diagram showing a specific constitution of a control section shown by FIG. 2.

DETAILED DESCRIPTION OF THE PREFERRED EMBODIMENTS

Figure 1:
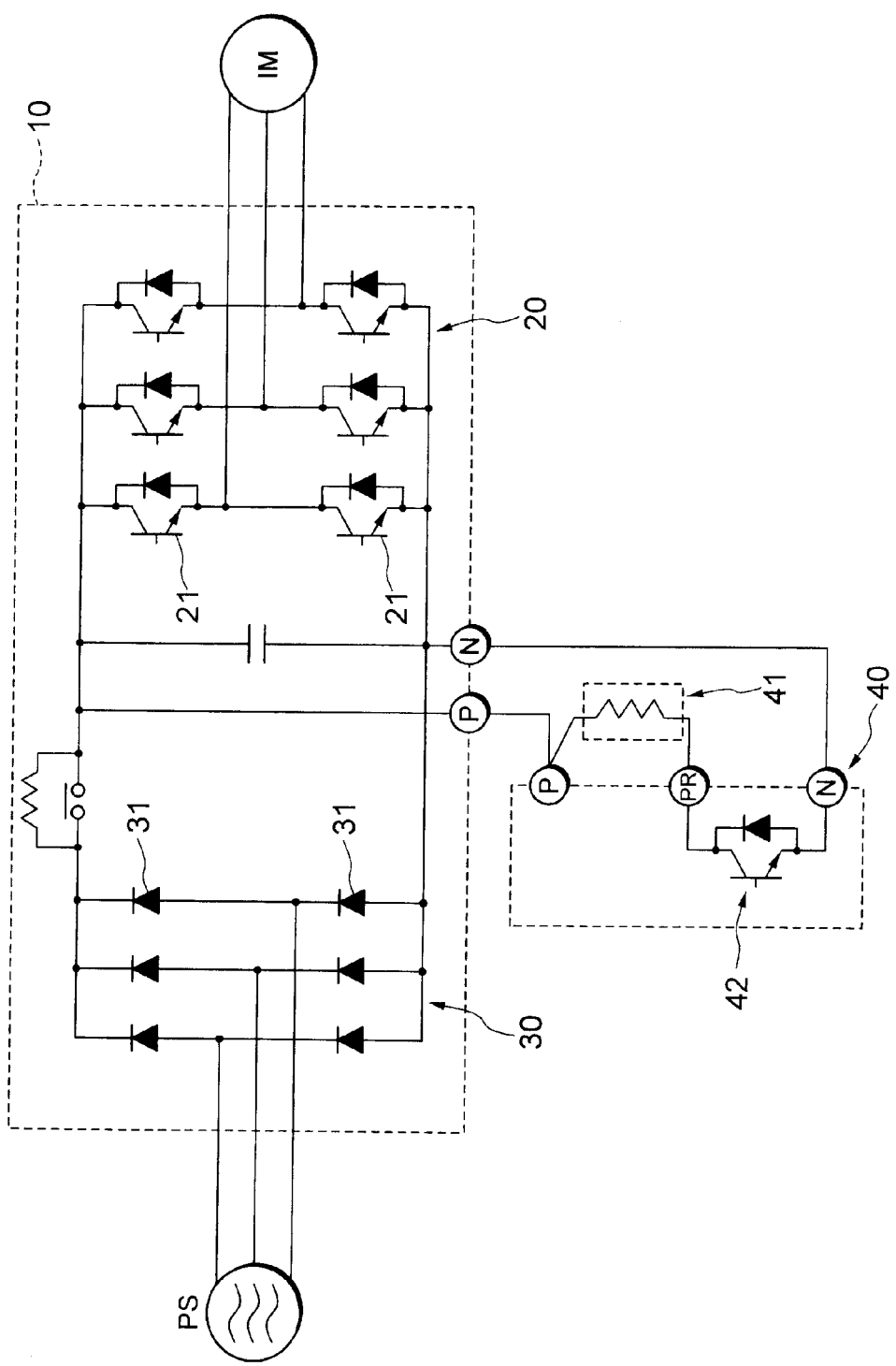
FIG. 1 is a diagram showing an example of a motor drive used in a conventional motor-driven injection molding machine.
Figure 2:
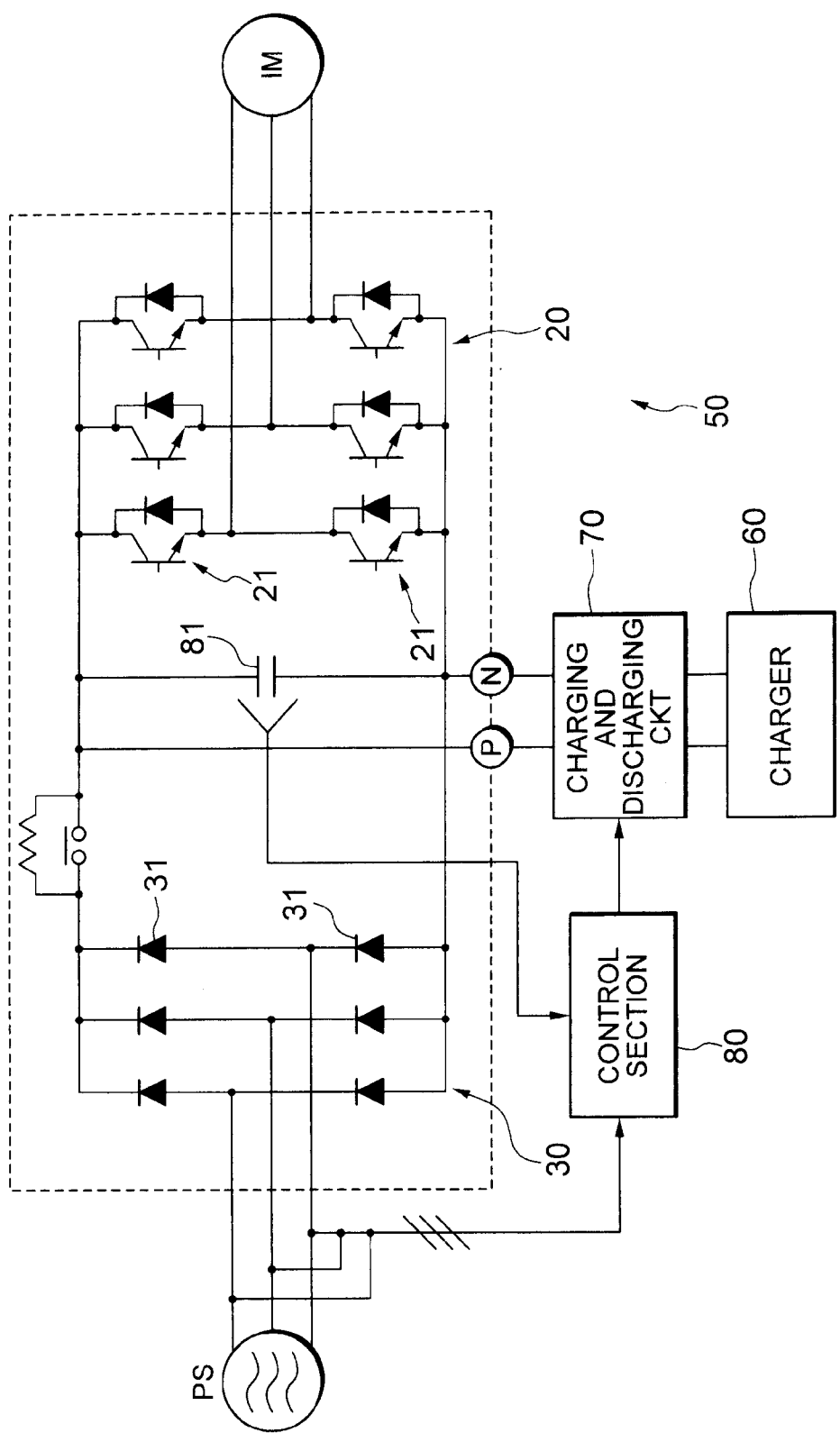
FIG. 2 is a diagram showing a constitution of a motor drive according to an embodiment of the present invention.

An explanation will be given of a motor drive according to a preferred embodiment of the invention in reference to FIG. 2 and FIG. 3. In FIG. 2, a motor drive 50 according to the embodiment is provided with a charger 60, a charging and discharging circuit 70 and a control section 80 other than the inverter section 20 and the rectifying circuit section 30 similar to the conventional apparatus.

The charger 60 stores regenerated electric power of the induction motor IM via the inverter section 20. When there is allowance in electric power on the side of the three phase power source PS in comparison with consumed electric power of the induction motor IM, the charger 60 stores the allowance electric power. The charging and discharging circuit 70 is for charging the electric power to the charger 60 and discharging the electric power from the charger 60. The control section 80 carries out control for making the charger 60 charge the electric power when the induction motor IM generates the regenerated electric power. The control section 80 carries out the control for making the charger 60 supply the electric power to the induction motor IM at accelerating the induction motor IM or the electricity interruption. The control section 80 also carries out the control for making the charger 60 charge the electric power when there is allowance in the electric power on the side of the three phase power source PS in comparison with the consumed electric power of the induction motor IM.

Also in reference to FIG. 3, the control section 80 includes a first voltage detecting portion 81 for detecting voltage on the input side of the inverter portion 20. The first voltage detecting portion 80 is realized by, for example, a smoothing condenser. The control section 80 also includes a first comparing portion 86. When a detected value detected by the first voltage detecting portion 81 is not lower than a predetermined value, the first comparing portion 86 outputs a charging control signal for making the charger 60 charge the electric power. The first comparing portion 86 outputs a discharging control signal for making the charger 60 discharge the electric power when the detected value of the first voltage detecting portion 81 becomes lower than the predetermined value. This utilizes the fact that whereas in decelerating the induction motor IM, voltage at the first voltage detecting portion 81 is increased by the regenerated electric power despite a short period of time, in accelerating the induction motor IM, the voltage in the first voltage detecting portion 81 is reduced despite a short period of time. Further, it is preferable to provide the predetermined value with certain widths respectively on the side of increasing voltage and on other side of reducing voltage.

Particularly according to the embodiment, the first comparing portion 86 includes a second voltage detecting portion 86-1 for detecting voltage on the side of the three phase power source PS as the above-described predetermined value, a compensator 86-2, an adder 86-3, a DC link voltage instructor 86-4 and a comparator 86-5. The compensator 86-2 is for amplifying the detected value from the second voltage detecting portion 86-1 by a predetermined gain. The adder 86-3 carries out addition, mentioned later. The DC link voltage instructor 86-4 holds and outputs a reference value to constitute the above-described predetermined value based on an output from the adder 86-3. In this way, the comparator 86-5 compares the voltage detected by the second voltage detecting portion 86-1 with the detected value of the first voltage detecting portion 81 and outputs the charging control signal for making the charger 60 charge the electric power when the detected value from the first voltage detecting portion 81 is not lower than the above-described predetermined value, that is, the reference value. Further, the comparator 86-5 outputs the discharging control signal for making the charger 60 discharge the electric power when the detected value of the first voltage detecting portion 81 is lower than the reference value.

The second voltage detecting portion 86-1 is provided because of the following reason. There are a plurality of kinds of the voltage value of the three phase power source such as 100 V, 110 V, 200 V and 220 V. The voltage value of the three phase power source PS used in the injection molding machine to which the invention is applied, is selected from the above-described plurality of kinds. Therefore, the reference value at the comparator 86-5 must be set in accordance with the voltage value of the three phase power source PS. With regard thereto, by constituting the first comparing portion 86 as in the above-described embodiment, the above-described setting operation is dispensed with. The second voltage detecting portion 86-1, the compensator 86-2, the adder 86-3, and the DC link voltage instructor 86-4 may collectively be called a setting portion.

When operation of setting the reference value at the comparator 86-5 in accordance with the voltage value of the three phase power source PS, the first comparing portion 86 is constructed by the following constitution. That is, the first comparing portion 86 may be provided with a setting portion for setting the above-described predetermined value as the reference value and a comparator for comparing the set predetermined value with the detected value of the voltage detecting portion 81. The comparator in this case may be the same as the comparator 86-5 shown in FIG. 3. In this case, an output from the setting portion may be connected to a terminal other than an input terminal for the detected value of the first voltage detecting portion 81.

The control section 80 according to the embodiment is further provided with a second comparing portion 87 on an output side of the comparator 86-5. The second comparing portion 87 is for comparing the voltage of the charger 60 with a set value which has previously been set and outputting a control signal for making the charger 60 charge the electric power when the voltage of the charger 60 becomes lower than the set value which has previously been set. Therefore, the second comparing portion 87 is provided with a comparator 87-1 in which the voltage from the charger 60 constitutes one input and the set value which has previously been set constitutes other input as a charge amount instruction value. The comparator 87-1 outputs a charge instruction signal as a control signal when the voltage of the charger 60 becomes lower than the set value which has previously been set. The second comparing portion 87 is further provided with a comparator 87-2. The comparator 87-2 compares the charge instruction signal from the comparator 87-1 with the charging control signal and the discharging control signal from the comparator 86-5 and makes the charging and discharging circuit 70 execute operation of charging and operation of discharging electricity to and from the charger 60. When the comparator 87-2 receives the discharging control signal from the comparator 86-5, even in the case in which the charging instruction signal is outputted from the comparator 87-1, the comparator 87-2 gives priority to the discharging control signal and makes the charging and discharging circuit 70 execute the discharging operation of the charger 60.

The charger 60 is for storing regenerated electric power generated by the induction motor IM in deceleration via the inverter section 20 and may be a battery capable of executing floating charge.

By the above-described constitution, the control section 80 can charge the electric power to the charger 60 via the charging and discharging circuit 70 when the regenerated electric power is generated by decelerating the induction motor IM. Further, the control section 80 can carry out the control of supplying the electric power of the charger 60 to the induction motor IM in acceleration or electricity interruption. Further, the control section 80 carries out the control of making the charger 60 charge the electric power when there is allowance in the electric power on the side of the three phase power source PS in comparison with the consumed electric power of the induction motor IM. The electric power for charging the electric power in this case is supplied from the three phase power source PS.

It is preferable that such motor drive 50 is individually provided for each of the motors provided to the injection molding machine. There are motors for an injection shaft, a mold opening and closing shaft, a resin measuring shaft and an ejector shaft as main ones of the motors provided to the injection molding machine, which are induction motors.

In accelerating the induction motor IM, the electric power is supplied to the induction motor IM via the rectifying circuit section 30 and the inverter section 20. In decelerating the induction motor IM, the induction motor IM generates the regenerated electric power. As a result, the voltage at the first voltage detecting portion 81 is increased. In this case, the charging control signal is outputted from the comparator 86-5 and accordingly, the regenerated electric power of the induction motor IM is charged to the charger 60 via the inverter section 20.

Meanwhile, when the induction motor IM is accelerated, the voltage at the first voltage detecting portion 81 is reduced. In this case, the discharging control signal is outputted from the comparator 86-5. As a result, the electric power from the charger 60 is supplied to the induction motor IM via the inverter section 20. This is similar also to the case in which the voltage at the first voltage detecting portion 81 is reduced by the electricity interruption.

A control system of a main body of the injection molding machine is provided with a backup function for storing molding conditions even when the electricity interruption occurs. Meanwhile, the electric power can be supplied from the charger 60 to the induction motor IM although not in a long period time. Hence, the control system of the main body of the injection molding machine is made to execute control operation until a molding cycle is finished even in the midst of the molding cycle when the electricity interruption occurs. In this way, there can be eliminated a state in which resin is charged into the mold in an unfinished manner. Thereby, there is facilitated restoring operation including resetting operation in restarting after electricity service is restored from the electricity interruption.

Further, when the control system of the main body of the injection molding machine is not provided with the backup function, described above, there can be constructed also a constitution in which the electric power of the charger 60 can be utilized for backup.

Meanwhile, the motor drive 50 of the induction motor IM, particularly, the inverter section 20 is controlled by other controller (not illustrated) for controlling thereof.

The other controller is given instruction of decelerating and instruction of accelerating the induction motor IM in accordance with the molding conditions. In other words, a deceleration timing or an acceleration timing in one cycle of molding can be known beforehand for the respective induction motor. Therefore, the control section 80 can also control the charging operation and the discharging operation in accordance with the deceleration timing and the acceleration timing. FIG. 3 shows a charge and discharge timing setting portion 88 as the constitution therefor. The charge and discharge timing setting portion 88 is provided with an operating condition setting portion 88-1 and a compensator 88-2. The operating condition setting portion 88-1 is for setting the deceleration timing and the acceleration timing in one cycle, outputs a negative signal for executing the charging operation in deceleration and outputs a positive signal for executing the discharging operation in acceleration. The compensator 88-2 is for amplifying a signal from the operating condition setting portion 88-1 by a predetermined gain. The adder 86-3 adds the output from the compensator 86-1 and the output from the compensator 88-2.

Although according to the above-described description, an explanation has been given of the case of providing the charger 60 for the respective induction motor, one charger may commonly be used by a plurality of numbers of motor drive. However, the control section 80 needs to provide for the respective motor. The present invention is not limited to the injection molding machine using the three phase power source but is applicable to an injection molding machine using a single phase power source or a two phase power source.

As has been described, according to the invention, the following effects are achieved.

1) Running cost is reduced by an electric power conservation effect achieved by storing and effectively utilizing regenerated electric power which has conventionally been dissipated as heat.

2) Even when the electricity interruption occurs during operation, the operation can be maintained until finishing one molding cycle without interrupting the molding cycle by utilizing the electric power of the charger and accordingly, restoring operation is facilitated after electricity service is restored from the electricity interruption.

What is claimed is:

1. An injection molding machine, comprising:
   a drive source comprising at least one motor and a motor drive;
   a charger for storing regenerated electric power of the motor and electric power from a power source;
   a charging and discharging circuit connected to said charger for charging electric power to the charger and for discharging electric power therefrom; and
   a controller for controlling the charger to charge electric power and for controlling the charger to supply electric power to the motor,
   said controller including a first voltage detecting unit for detecting a voltage on an inverter section included in said motor drive and comparing a voltage detected by the first voltage detecting unit with a predetermined value, the controller controlling the charging and discharging circuit based upon the comparing result.

2. An injection molding machine as recited in claim 1, wherein the controller controls the charger to charge electric power when the motor generates regenerated electric power, and controls the charger to supply electric power to the motor to accelerate the motor.

3. An injection molding machine as recited in claim 1, wherein the controller controls the charger to charge electric power when the motor generates regenerated electric power, and controls the charger to supply electric power to the motor during electricity interruption from the power source.

4. An injection molding machine as recited in claim 1, wherein said controller further comprises:
   a first comparing unit for outputting a charging control signal for controlling the charger to charge the electric power when the voltage detected by the first voltage detecting unit is not lower than the predetermined value.

5. An injection molding machine as recited in claim 4, wherein said first comparing unit outputs a discharging control signal for making the charger discharge electric power when the detected value is lower than the predetermined value.

6. An injection molding machine as recited in claim 4, wherein:
   the first comparing unit comprises a second voltage detecting unit connected to the power source, and a comparator for comparing a voltage value detected by the second voltage detecting unit with the voltage detected by the first voltage detecting unit.

7. An injection molding machine as recited in claim 6, wherein said first comparing unit further comprises a compensator connected to said second voltage detecting unit and said comparator, for compensating an output of the second voltage detecting unit.

8. An injection molding machine as recited in claim 4, wherein the first comparing unit comprises:
   a setting unit for setting the predetermined value as a reference value, and a comparator for comparing the predetermined value with the voltage detected by the first voltage detecting unit.

9. An injection molding machine as recited in claim 4, wherein said first comparing unit comprises:
- a second voltage detecting unit connected to the power source;
- an operating condition setting unit for setting the predetermined value as a reference value;
- an adding unit for adding an output of the second voltage detecting unit and the operating condition setting unit; and
- a comparator for comparing an output of the adding unit to an output of the first voltage detecting unit, said output of said adding unit providing the predetermined value to the comparator, said comparator outputting the charging control signal for making the charger charge the electric power when the detected value detected by the first voltage detecting unit is not lower than the predetermined value, and outputting a discharging control signal for making the charger discharge the electric power when the detected value is lower than the predetermined value.

10. An injection molding machine as recited in claim 4, wherein said controller further comprises a second comparing unit on an output side of the first comparing unit, said second comparing unit comparing a voltage of the charger with a predetermined charge value, and outputting a control signal for controlling the charger to charge electric power when the voltage of the charger is lower than the predetermined charge value.

11. An injection molding machine as recited in claim 10, wherein said second comparing unit provides priority to a discharge control signal and controls the charging and discharging circuit to discharge electric power from the charger in the event of power interruption from the power source.

12. A method of providing drive power to an injection molding machine, said method comprising the steps of:
- controlling a charger to charge electric power from a power source and to supply electric power to a motor of the injection molding machine,
- the controlling step comprising a first detecting step for detecting a first voltage value on an inverter section and a first comparing step for comparing the first voltage value detected by the first detecting step with a predetermined value, a controller providing control signals to a charging and discharging circuit based upon the comparing result of the first comparing step.

13. A method as recited in claim 12, wherein said controlling step controls the charger to charge electric power when the motor generates regenerated electric power, and controls the charger to supply electric power to the motor to accelerate the motor.

14. A method as recited in claim 12, wherein said controlling step comprises controlling the charger to charge electric power when the motor generates regenerated electric power, and controls the charger to supply electric power to the motor during electricity interruption from the power source.

15. A method as recited in claim 12, wherein said controlling step further comprises:
- outputting a charging control signal for controlling the charger to charge electric power when the first voltage value detected by the first detecting step is not lower than the predetermined value.

16. A method as recited in claim 15, wherein said step of outputting a charging control signal comprises a step of outputting a discharging control signal for making the charger discharge electric power when the detected value is lower than the predetermined value.

17. A method as recited in claim 15, further comprising a second detecting step of detecting a second voltage value, and comparing the second voltage value to the first voltage value.

18. A method as recited in claim 15, further comprising a step of setting the predetermined value as a reference value, and comparing the predetermined value with the first voltage value.

19. A method as recited in claim 15, said method further comprising the steps of:
- setting the predetermined value as a reference value;
- adding a second voltage value detected from a power source to the reference value;
- comparing a result of the adding step to the first voltage value, the output of the adding unit providing the predetermined value for the comparing step;
- outputting a charging control signal for making the charger charge the electric power when the first voltage value is not lower than the predetermined value; and
- outputting a discharging control signal for making the charger discharge the electric power when the first voltage value is lower than the predetermined value.

* * * * *